(12) United States Patent
Archer

(10) Patent No.: US 7,364,172 B1
(45) Date of Patent: Apr. 29, 2008

(54) DEVICE FOR TRANSFORMING A STATIONARY BUCKET INTO A ROLLING BUCKET, FUNCTIONING AS A LID, AND ALSO FACILITATING ATTACHMENT OF A SUBSTANCE REMOVAL DEVICE

(76) Inventor: Brian Archer, 340 Avenida del Recreo, Ojai, CA (US) 93023

( * ) Notice: Subject to any disclaimer, the term of this patent is extended or adjusted under 35 U.S.C. 154(b) by 244 days.

(21) Appl. No.: 11/107,237

(22) Filed: Apr. 14, 2005

(51) Int. Cl.
*B62B 3/00* (2006.01)
(52) U.S. Cl. .................. 280/79.5; 280/79.11; 280/79.2; 280/47.34; 220/908; 220/625
(58) Field of Classification Search .............. 280/79.5, 280/79.11, 79.2, 47.34; 220/908, 625
See application file for complete search history.

(56) References Cited

U.S. PATENT DOCUMENTS

| | | | |
|---|---|---|---|
| 926,288 A | 6/1909 | Rice | |
| 3,370,864 A | 2/1968 | Burgoon | |
| 5,123,667 A | 6/1992 | Stolzman | |
| 5,472,220 A | 12/1995 | Stephan | |
| 5,531,351 A * | 7/1996 | Logsdon | 220/571.1 |
| 5,758,888 A * | 6/1998 | Burgan et al. | 280/47.34 |
| 5,806,867 A | 9/1998 | Hampton | |
| 6,010,024 A * | 1/2000 | Wang | 220/23.87 |
| 6,209,891 B1 * | 4/2001 | Herrmann | 280/32.6 |
| RE37,350 E * | 9/2001 | Stephan | 280/79.5 |
| 6,488,293 B1 * | 12/2002 | Mitchell et al. | 280/47.34 |
| 7,044,323 B2 * | 5/2006 | Yang et al. | 220/263 |
| 2004/0145139 A1 | 7/2004 | Kershaw | |

* cited by examiner

*Primary Examiner*—Christopher P. Ellis
*Assistant Examiner*—Cynthia F. Collado
(74) *Attorney, Agent, or Firm*—Thomas I. Rozsa

(57) ABSTRACT

A dolly which is removably attachable to a bucket which is used for construction work such as retaining tile grout or is used for gardening. The attachment device has one section which can be press fit onto the bottom of the bucket so that the bucket can be rolled and a second section which can be press fit onto the top of the bucket so that the bucket is sealed to prevent its contents from drying out. The device also has an optional seating platform to support accessory items to be used with the bucket.

11 Claims, 2 Drawing Sheets

DEVICE FOR TRANSFORMING A STATIONARY BUCKET INTO A ROLLING BUCKET, FUNCTIONING AS A LID, AND ALSO FACILITATING ATTACHMENT OF A SUBSTANCE REMOVAL DEVICE

BACKGROUND OF THE INVENTION

1. Field of the Invention

The present invention relates to dollies which enable a bucket to be rolled from one location to another and which enable a user to close the bucket when it is not in use. In particular, the field of the present invention relates to buckets which are used in construction projects such as tiling, painting, drywall taping, or in gardening.

2. Description of the Prior Art

In general, dollies that facilitate rolling transport of a bucket are known in the prior art. The following nine (9) patents are relevant to the field of the present invention.

1. U.S. Pat. No. 926,288 issued to Rice on Jun. 29, 1909 for "Barrel Truck" (hereafter the "Rice patent");

2. U.S. Pat. No. 3,370,864 issued to Burgoon on Feb. 27, 1968 for "Adjustable Quick-Acting Clamp" (hereafter the "Burgoon patent");

3. U.S. Pat. No. 5,123,667 issued to Stolzman on Jun. 23, 1992 for "Material Handling Rings" (hereafter the "Stolzman patent");

4. U.S. Pat. No. 5,472,220 issued to Stephan on Dec. 5, 1995 for "Bucket Dolly" (hereafter the "Stephan patent");

5. U.S. Pat. No. 5,531,351 issued to Logsdon on Jul. 2, 1996 for "Multi-Function Drum Cap" (hereafter the "Logsdon patent");

6. U.S. Pat. No. 5,758,888 issued to Burgan on Jun. 2, 1998 for "Refuse Container And Dolly Having Foot Activated Release Mechanism" (hereafter the "Burgan patent");

7. U.S. Pat. No. 5,806,867 issued to Hampton on Sep. 15, 1998 for "Bucket Trolley With Detachable Extension Handle" (hereafter the "Hampton patent");

8. U.S. Pat. No. 6,209,891 B1 issued to Herrmann on Apr. 3, 2001 for "Workseat Cart" (hereafter the "Herrmann patent");

9. United States Published Patent, Publication No. US 2004/0145139 A1 issued to Kershaw on Jul. 29, 2004 for "Caster Supported Mobile Tray" (hereafter the "Kershaw patent Publication").

The Rice patent is a barrel truck and discloses the concept of having a device which fits onto the bottom of the barrel so that the barrel can be rolled. The body B of the barrel truck comprises wheel C and short hooks D. The wheels are arranged under the body B as illustrated in FIG. 1. This patent discloses the concept of having a generally barrel shaped object with a bottom member with a mating rolling member into which the barrel can be inserted so that it can be rolled or tipped. In this case, it is not a press fit but the hooks D have barbs d which can be embedded into the barrel. This makes sense for a wooden type barrel but would not be applicable to buckets made of plastic or synthetic materials.

The Burgoon patent deals with a rolling member that can be placed onto a vacuum cleaner canister and is retained thereon by a clamp member which is a novel feature of that invention. Specifically, the dolly 16 includes a mounting band 18 on which are rotatably mounted several casters 20 having pivot shafts 22 rotatably carried by suitable straps 24. The straps 24 also have flanges which extend inwardly under the lower end of the band 18 and engage the bottom of the tank 12 to prevent it from slipping through the band 18. This is once again an attachment to the bottom of the vacuum cleaner tank and is not a press fit attachment.

The Stolzman patent deals with a ring that is designed to be attached to the bottom of a drum so that the drum can be rolled. The ring which is best illustrated in FIG. 1 as item no. 10 is press fit around the bottom of the drum and retains thereon a multiplicity of casters on which the drum can be rolled. Once again, this is a specialized ring adapted to fit on the bottom portion of the drum.

The Stephan patent discloses the general concept of an item for rotating a bucket so that it does not have to be lifted. It has a dolly with an upwardly extending edge about 3 to 5 inches high, that generally conforms to the size of a standard five gallon bucket. The purpose of the invention is to be able to push around whatever materials one is working with, without having to pick the bucket up and move it. However, it does not necessarily show that there is a press fit so that the entire bucket can in fact be picked up with the wheels attached thereon. The bucket dolly 1 further includes a base 7 with a platform portion 8 to hold the bottom edge 6 of bucket 5, and a plurality of wheeled portions 9 to enable a worker to move around whatever materials a worker is working with, without having to manually pick up the bucket 5 in order to move the bucket.

The Logsdon patent does embody the concept of having a wheel member placed on top of the drum but it is for a different purpose. It includes a cap for commercially available 15, 30 or 55 gallon drums. The drum cap has various applications. First, referring to FIG. 1, the drum cap can be used as a protective cap 10 for the drum 12 having four legs 14 equidistantly spaced apart from each at the periphery of the drum cap. Each leg has a caster or wheel 16 on the top end which is removable. The legs 14 have convenient handhold apertures. The drum cap 10 has a friction fit with drum 12. The domed wall 18 has a central aperture or drain hole 32 from which extends a horizontal duct 34 leading to a vertical duct 36 having a metal or plastic ball valve 36 (see FIG. 2). In an alternative embodiment as shown in FIG. 4, the wheels are placed upside down on top of the drum cap so that the cap can serve as a drain for oil. The multifunction drum cap is utilized to serve as a cap to protect the drum top from the elements, an oil drain pan for vehicles when turned upside down and the drum funnel when turned upside down with or with the drum attached. What this doesn't show, however, is the concept of using the cap as a wheel on the bottom of the drum to be able to rotate the drum.

The Burgan patent discloses a refuse container which contains a dolly 14 having wheels. However, the innovative feature of this device is that there is a foot pedal on the dolly with mechanisms that enable the foot pedal when integrated with a pivotal action to raise the lid on the refuse container.

The Hampton patent is basically a bucket trolley and the innovative feature of this patent is that it has a detachable extension handle. The wheel trolley has a resilient engaging wall for retaining a standard sized bucket containing a load. The trolley includes a set of wheels and also a handle which can be threadedly attached to the dolly to have it moved.

The Herrmann patent is a workseat cart assembly for adapting a bucket-type container to be used as a seat with an accompanying equipment tray for a workman. The assembly includes a unitary body member having a receptacle for a bucket and a partitioned equipment retainer tray surrounding the bucket.

The Kershaw Published patent Application discloses a mobile tray. Referring to Section 15 it states "The recessed level of the wheeled carrier indicated by the diameter D also provides an accessible area to accommodate various sized containers, notably, pails, cans or buckets up to 5 gallon size that are retained by a shallow wall 7 which wall can be cleared by a limited lifting of the container.

There is a significant need for an improved attachment device which facilitates rolling transport of a bucket and also enables the bucket to be lifted with the wheels in place, facilitates closure of the bucket when not in use, and facilitates substance removable apparatus to be attached adjacent to the bucket.

SUMMARY OF THE INVENTION

The present invention is a dolly which is removably attachable to a bucket which is used for construction work such as retaining tile grout or is used for gardening. The attachment device has one section which can be press fit onto the bottom of the bucket so that the bucket can be rolled and a second section which can be press fit onto the top of the bucket so that the bucket is sealed to prevent its contents from drying out. The device also has an optional seating platform to support accessory items to be used with the bucket.

It has been discovered, according to the present invention, that use of a rolling device having a double attaching mechanism, and which can be press fit onto the bottom of a bucket and which can be press fit onto the bucket top provides a device to enable the bucket to be rolled when in use or picked up and carried with the dolly still attached and to be sealed when not in use. The dolly can be easily removed by using either hands or feet.

It has also been discovered, according to the present invention, that if the rolling device incorporates receiving means on its underside, the receiving means can retain a supporting platform to be used to support attachments to the bucket.

It is therefore an object of the present invention to provide an attachment dolly which enables a bucket to be rolled when in use so it is not necessary to lift a heavy bucket filled with contents and to also enable the bucket to be sealed when not in use so that the contents within the bucket will not dry out and be spoiled.

It is another object of the present invention to provide attachment means to the attachment dolly to permit accessory items to be supported adjacent the bucket.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
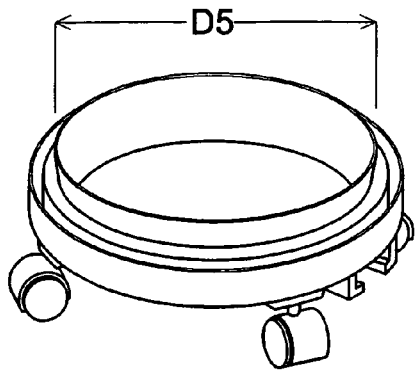
FIG. 1 is a perspective view of the present invention transportation and sealing device illustrating receiving means on the bottom undercarriage to accommodate an attachment support platform.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a device for transforming a bucket into a rolling bucket for easy utilization during construction projects such as a tiling, drywall taping or wallpapering or retaining fertilizer for gardening. The present invention enables drywall tapers to roll mud in a bucket and carry a bazooka pump which is attached to the bucket all in one operation. Current buckets are typically fairly heavy after they are filled and the construction or gardening person who is usually on his knees when he is working on a project such as tiling an area or in the case of a gardener, fertilizing or watering plants, has difficulty moving the bucket and further, it can create a torque on the person's back while they lift the heavy object while kneeling.

Specifically, the present invention is to take a cylindrical object which is almost the same size as the circumference of the bottom of the bucket so that if the bottom of the bucket is placed in the cylindrical member, it is a press fit and is retained therein so that the bucket can actually be lifted with the cylindrical member holding onto the bottom of the bucket.

Surrounding the cylindrical member is a lid which exactly matches the lid of the opening of the bucket. Surrounding the lid member is a mating member to which is attached rolling wheels. Therefore, in use, the bucket is placed into the cylindrical member and therefore, when the bucket is filled with heavy items such as water or water and various compounds that are used in tiling or grouting or lathe and plastering or even gardening, the bucket can be easily rolled so that it is not necessary to lift the bucket and bring it to another area but simply roll the bucket to a different location.

When the device is desired to be closed and is not going to used such as during a lunch break, the member is turned upside down so that the lid member creates a tight press fit on the opening of the bucket so that the contents will not dry out while the worker is on a lunch break or a bathroom break.

In addition, the device incorporates a supporting platform to support a bazooka which is a device used to pump tile grout out of the bucket.

Therefore, the concept of the invention is to create a mating member which has a press fit to the bottom of the bucket so that the bucket can be moved in any direction whatsoever by rolling it as well as can be lifted if necessary and the entire attachment device will remain press fit to the bottom of the bucket. After the mating cylindrical member, there is a lid that can be used to close the bucket.

Figure 2:
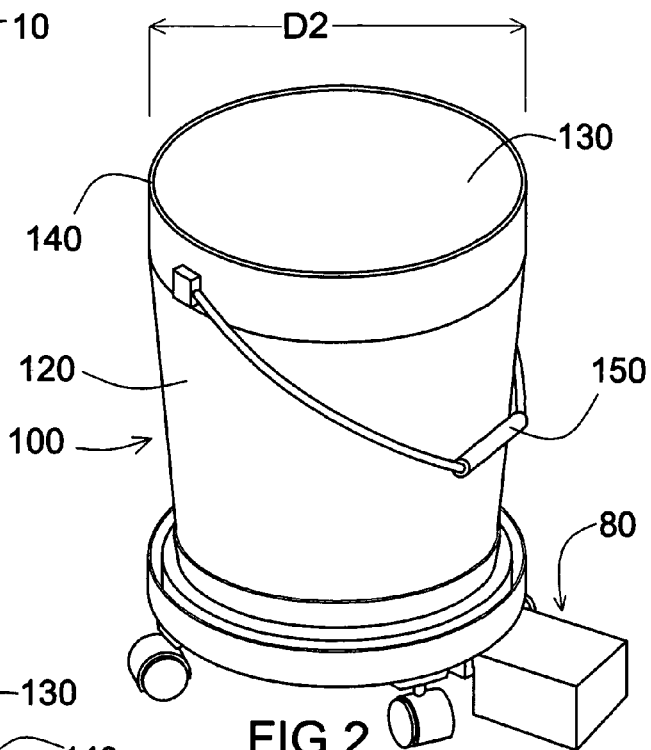
FIG. 2 is a perspective view of the present invention transportation and sealing device press fit onto the bottom of a bucket and also retaining the attachment support platform on its undercarriage.
Figure 3:
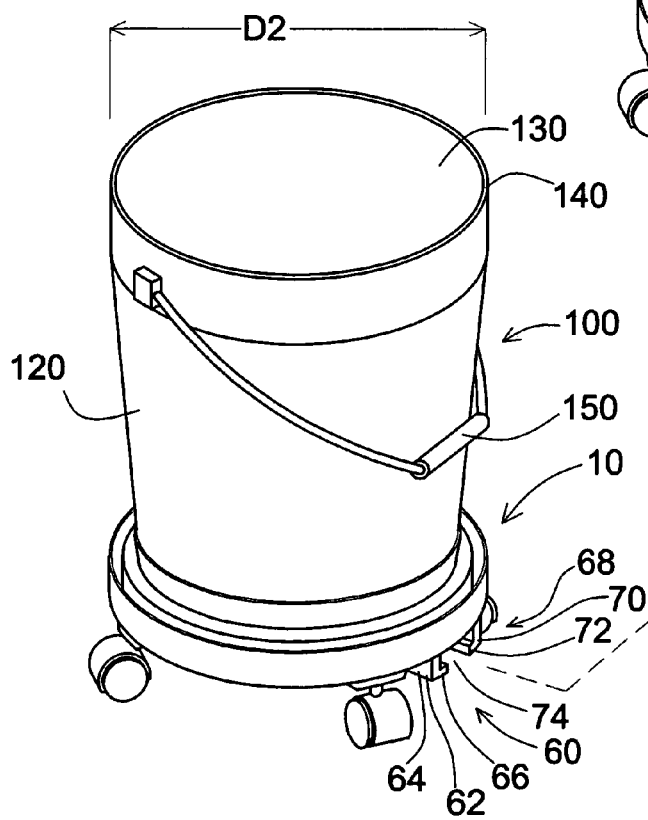
FIG. 3 is a perspective and partially exploded view of the present invention transportation and sealing device press fit onto the bottom of a bucket and also showing in the exploded view the attachment support platform and how it is to be slid into the rails of the receiving means on the bottom undercarriage of the transportation device.
Figure 4:
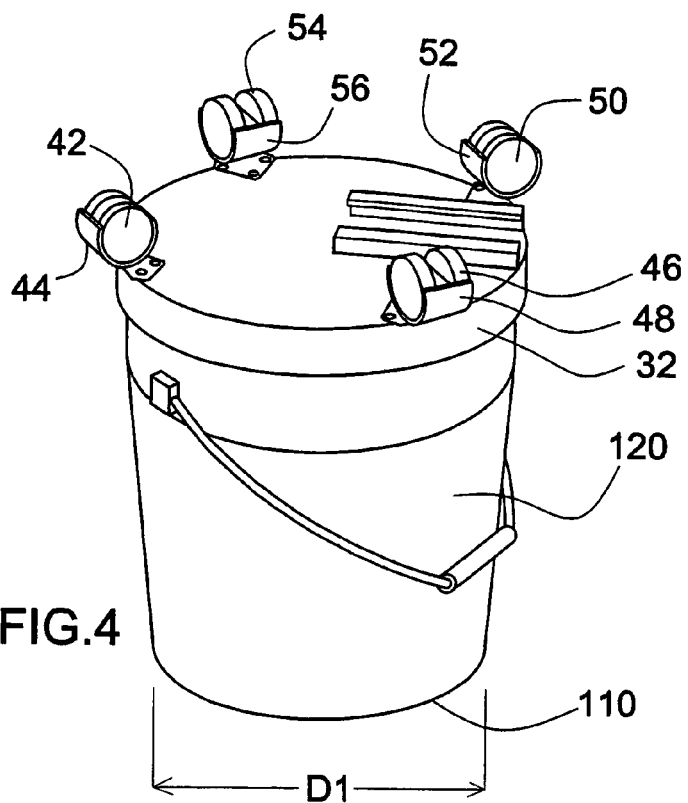
FIG. 4 is a perspective view of the present invention transportation and sealing device press fit onto the top of the bucket to seal it.
Figure 5:
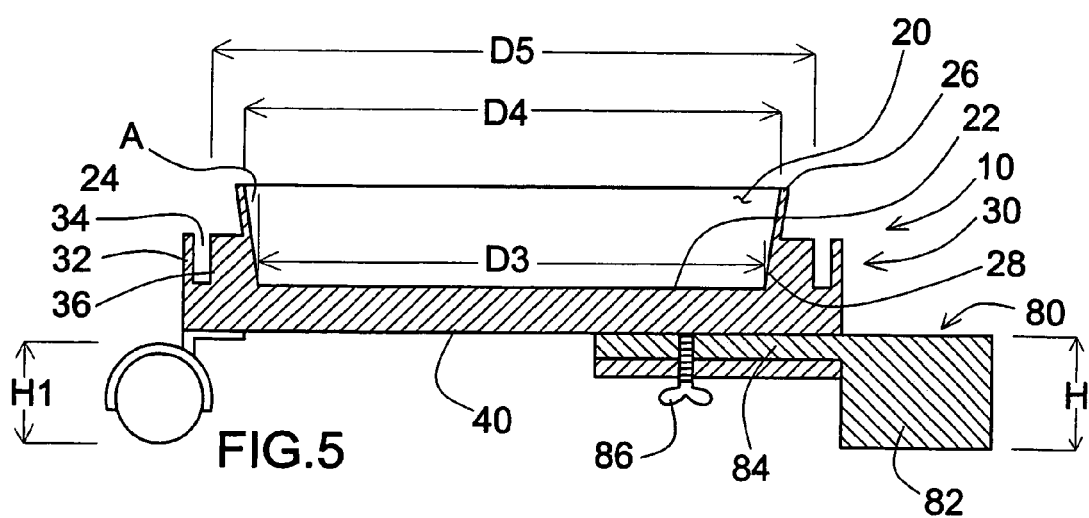
FIG. 5 is a cross-sectional view of the present invention transportation and sealing device press fit onto the bottom of a bucket with the attachment support platform in place.

Referring to FIGS. 1 through 5, the present invention rolling and sealing attachment device is shown at 10 and comprises an inner receiving section 20 having a flat bottom surface 22 and a circumferential sidewall 24 which in the preferred embodiment as best illustrated in FIG. 5 is generally slanted with an outward slant so that the diameter of the sidewall 24 is slightly greater at its top circumference 26 than at its bottom circumference 28 adjacent bottom surface 22. The device 10 is intended to be used with a bucket such as a 5 or 10 gallon bucket 100 having a bottom surface 110 with a diameter D1, a sidewall 120, a central chamber 130 for receiving material and an open top 140 having a diameter D2. The sidewall 24 of the device 10 is intended to be slightly greater than the diameter D1 but its bottom D3 adjacent its flat bottom surface 22 is about the same as diameter D1 of the bottom 110 of the bucket 100 with the diameter D4 at the top 26 is slightly greater than diameter D1 of the bucket 100 so that when the bucket 100 is inserted into the device 10 as illustrated in FIGS. 2 and 3, it is a press fit with the bottom surface 110 of the bucket either touching or just slightly above the bottom surface 22 of device 10. The upward angle of slant A of sidewall 24 is between one (1) degree and five (5) degrees. With the bucket 100 inserted in this manner, the entire device 10 and bucket 100 can be lifted by handle 150.

The device 10 further comprises a sealing section 30 having a circumferential sidewall 32 with a gap 34 formed between the interior of the circumferential sidewall 32 and an interior sidewall 36 which surrounds sidewall 24 of receiving section 20. The diameter D5 of the gap 34 is approximately the same as or slightly larger than the diameter D2 of the top 140 of the bucket 100 so that when the device 10 is removed from the bottom 110 of the bucket 100, it can be placed on top 140 of the bucket 100 as illustrated in FIG. 4 so that the top circumference 140 of bucket 100 fits within gap 34 and the bucket is sealed by outer circumferential sidewall 32 and inner sidewall 36.

The sealing section 30 further comprises a bottom wall 40 to which is attached a multiplicity of wheels or rollers. By way of example, the number of rollers can be four (4) as illustrated in FIG. 4, with roller 42 mounted to bottom surface 40 by mounting bracket 44, roller 46 mounted to bottom surface 40 by mounting bracket 48, roller 50 mounted to bottom surface 40 by mounting bracket 52 and roller 54 mounted to bottom surface 40 by mounting bracket 56. The method of attachment of the rollers is optional. While shown as being permanently attached, the brackets 56 can be removably attached to the bottom surface 40 by mating snap means, Velcro® fasteners, etc. As illustrated in FIG. 4, the rollers can be spaced 90 degrees apart. The present invention needs at least 2 rollers spaced 180 degrees apart but works better with three rollers spaced 120 degrees apart or four rollers spaced 90 degrees apart as illustrated in FIG. 4.

The bottom surface 40 also has attached thereto receiving means to receive a platform. By way of example, the receiving means 60 can be a pair of spaced apart rails, with first rail 62 having a vertical wall 64 and a horizontal wall 66 and second rail 68 having vertical wall 70 and horizontal wall 72, with the vertical walls 64 and 70 spaced apart and parallel to each other and horizontal walls 66 and 72 in the same plane and spaced apart but extending toward each other to form an interior channel 74.

The receiving means 60 is designed to receive and retain a supporting platform 80 which comprises a supporting base 82 having a height "H" which is the same vertical height "H1" of the combination roller and bracket. The supporting base 82 extends into a joining beam 84 which is sized to be received between the vertical and horizontal walls of first rail 62 and second rail 68 and is slidably fit into interior channel 74. A tightening screw 86 extends through the thickness of joining beam 84 and can be tightened against bottom surface 40 of sealing section 30 to retain the supporting platform underneath and to one side of the present invention rolling and sealing attachment device 10 as best illustrated in FIGS. 2, 3 and 5.

The supporting platform 80 is designed to support any attachment which will rest on the supporting base 82 and be used in conjunction with the bucket 10. By way of example, one such attachment is a bazooka which has a pumping mechanism resting on the supporting base 82 and a siphon pump which extends into one central chamber 130 of the bucket. The bazooka is used to pump tile grout out of the bucket and into a tray where the grout is affixed to walls.

It will be appreciated that other attachments for use in other applications can be used to rest on the supporting base.

Through use of the present invention, rolling and sealing attachment device, the bucket 100 can be used to rest within receiving section 20 as previously described and then filled with the desired materials which by way of example can be tile grout or gardening fertilizer. The user can then rest on his/her knees and scoop the required material out of the bucket and when the person is finished with that location, the person can easily roll the bucket and press fit attachment 10 to the next location. When the location is too far, the person can stand and carry the bucket 100 by its handle 150 with the attachment device 10 remaining in place because of the press fit.

If the tile setter or gardener needs to take a break for lunch or to go to the bathroom, the device 10 can be removed from the bottom 10 from the bottom 110 and lower portion of sidewall 20 of the bucket and then the sealing section 30 can be placed over the top 140 of bucket 100 in the manner previously described so that the contents contained in the bucket won't dry out.

After the work is completed, the contents are expelled out of the bucket and the bucket 100 and attachment device 10 can either be separately carried or joined together with the attachment device 10 on the bottom of the bucket or the top of the bucket in the manner previously described.

The entire attachment device 10 including the receiving section 20 and its components and the sealing section 30 and its components and the receiving means 60 and its components can be formed in a single piece of material such as molded plastic or its derivatives including polypropylene, polyethylene, etc. The rollers or wheels can thereafter be attached. The supporting platform 80 and its components can also be molded out of the same material as the attachment device 10.

Defined in detail, the present invention is a device for use with a bucket having a bottom surface of a given diameter, a sidewall, an interior chamber surrounded by the bottom surface and the sidewall and a top circumference of a given diameter at the top of the sidewall, the device comprising: (a) a receiving section having a bottom surface of a given diameter and a circumferential sidewall with a top circumference of a given diameter, the diameter of the bottom surface being approximately the same as the diameter of the bottom surface of the bucket and the diameter of the top circumference being slightly larger than the diameter of the bottom surface of the bucket so that when the bucket is inserted into the receiving section, a press fit is achieved; (b)

a sealing section connected to and surrounding the receiving section, the sealing section having an exterior sidewall and an interior sidewall which surrounds the circumferential sidewall of the receiving section, a gap of a given diameter spaced between the exterior sidewall and the interior sidewall of the sealing section, the diameter of the gap being only slightly larger than the diameter of the top circumference of the bucket so that a press fit is achieved when the sealing section is placed on top of the bucket; (c) the bottom of the sealing section having a lower surface with a multiplicity of rolling members rotatably attached to the lower surface of the bottom of the sealing section, the rolling member and the attachment means each having a given height; (d) a receiving means attached to the lower surface of the bottom of the sealing section, the receiving means having a first rail with a vertical wall and a horizontal wall and a second rail with a vertical wall and a horizontal wall, the vertical walls being parallel and spaced apart and the horizontal walls being in the same plane, parallel to the lower surface of the bottom of the sealing section and extending toward each other to form an interior channel between the rails; and (e) a supporting platform comprising a supporting base having a height equal to the height of each of the multiplicity of wheels and their attachment means and a joining beam with a transverse tightening means, the joining beam received within the interior channel of the receiving means and tightened therein by the tightening means.

Defined broadly, the present invention is a device for use with a bucket having a bottom surface of a given diameter, a sidewall, an interior chamber surrounded by the bottom surface and the sidewall and a top circumference of a given diameter at the top of the sidewall, the device comprising: (a) receiving section having a bottom surface of a given diameter and a circumferential sidewall with a top circumference of a given diameter, the diameter of the bottom surface being approximately the same as the diameter of the bottom surface of the bucket and the diameter of the top circumference being slightly larger than the diameter of the bottom surface of the bucket so that when the bucket is inserted into the receiving section, a press fit is achieved; (b) a sealing section connected to and surrounding the receiving section, the sealing section having an exterior sidewall and an interior sidewall which surrounds the circumferential sidewall of the receiving section, a gap of a given diameter spaced between the exterior sidewall and the interior sidewall of the sealing section, the diameter of the gap being only slightly larger than the diameter of the top circumference of the bucket so that a press fit is achieved when the sealing section is placed on top of the bucket; and (c) the bottom of the sealing section having a lower surface with a multiplicity of rolling members rotatably attached to the lower surface of the bottom of the sealing section, the rolling member and the attachment means each having a given height.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A device for use with a bucket having a bottom surface of a given diameter, a sidewall, an interior chamber surrounded by the bottom surface and the sidewall and a top circumference of a given diameter at the top of the sidewall, the device comprising:
    a. a receiving section having a bottom surface of a given diameter and a circumferential sidewall with a top circumference of a given diameter, the diameter of the bottom surface being approximately the same as the diameter of the bottom surface of the bucket and the diameter of the top circumference being slightly larger than the diameter of the bottom surface of the bucket so that when the bucket is inserted into the receiving section, a press fit is achieved;
    b. a sealing section connected to and surrounding the receiving section, the sealing section having an exterior sidewall and an interior sidewall which surrounds the circumferential sidewall of the receiving section, a gap of a given diameter spaced between the exterior sidewall and the interior sidewall of the sealing section, the diameter of the gap being only slightly larger than the diameter of the top circumference of the bucket so that a press fit is achieved when the sealing section is placed on top of the bucket;
    c. the bottom of the sealing section having a lower surface with a multiplicity of rolling members rotatably attached to the lower surface of the bottom of the sealing section, the rolling member and the attachment means each having a given height;
    d. a receiving means attached to the lower surface of the bottom of the sealing section, the receiving means having a first rail with a vertical wall and a horizontal wall and a second rail with a vertical wall and a horizontal wall, the vertical walls being parallel and spaced apart and the horizontal walls being in the same plane, parallel to the lower surface of the bottom of the sealing section and extending toward each other to form an interior channel between the rails; and
    e. a supporting platform comprising a supporting base having a height equal to the height of each of the multiplicity of wheels and their attachment means and a joining beam with a transverse tightening means, the joining beam received within the interior channel of the receiving means and tightened therein by said tightening means.

2. The device in accordance with claim 1, wherein said receiving section and its components, said sealing section and its components and said receiving means and its components are all formed in one piece.

3. The device in accordance with claim 1, wherein the circumferential sidewall of said receiving section extends upwardly from the bottom surface to the top of the sidewall at an angle between one degree and five degrees.

4. The device in accordance with claim 1, wherein the components of the device are molded out of a single piece of plastic.

5. A device for use with a bucket having a bottom surface of a given diameter, a sidewall, an interior chamber surrounded by the bottom surface and the sidewall and a top circumference of a given diameter at the top of the sidewall, the device comprising:
    a. receiving section having a bottom surface of a given diameter and a circumferential sidewall with a top circumference of a given diameter, the diameter of the bottom surface being approximately the same as the diameter of the bottom surface of the bucket and the diameter of the top circumference being slightly larger than the diameter of the bottom surface of the bucket so that when the bucket is inserted into the receiving section, a press fit is achieved;

b. a sealing section connected to and surrounding the receiving section, the sealing section having an exterior sidewall and an interior sidewall which surrounds the circumferential sidewall of the receiving section, a gap of a given diameter spaced between the exterior sidewall and the interior sidewall of the sealing section, the diameter of the gap being only slightly larger than the diameter of the top circumference of the bucket so that a press fit is achieved when the sealing section is placed on top of the bucket; and c. the bottom of the sealing section having a lower surface with a multiplicity of rolling members rotatably attached to the lower surface of the bottom of the sealing section, the rolling member and the attachment means each having a given height.

6. The device in accordance with claim 5, further comprising:

a. receiving means attached to the lower surface of the bottom of the sealing section, the receiving means having a first rail with a vertical wall and a horizontal wall and a second rail with a vertical wall and a horizontal wall, the vertical walls being parallel and spaced apart and the horizontal walls being in the same plane, parallel to the lower surface of the bottom of the sealing section and extending toward each other to form an interior channel between the rails; and b. a supporting platform comprising a supporting base having a height equal to the height of each of the multiplicity of wheels and their attachment means and a joining beam with a transverse tightening means, the joining beam received within the interior channel of the receiving means and tightened therein by said tightening means.

7. The device in accordance with claim 5, wherein said receiving section and its components and said sealing section and its components are all formed in one piece.

8. The device in accordance with claim 7, wherein said components are molded out of a single piece of plastic.

9. The device in accordance with claim 6, wherein said receiving section and its components, said sealing section and its components and said receiving means and its components are all formed in one piece.

10. The device in accordance with claim 9, wherein said components are all molded out of a single piece of plastic.

11. The device in accordance with claim 5, wherein the circumferential sidewall of said receiving section extends upwardly from the bottom surface to the top of the sidewall at an angle between one degree and five degrees.

\* \* \* \* \*